May 1, 1928.　　　　　　　　　　　　　　　　　　　1,667,742
K. G. SCHEIBEL
MACHINE FOR PERFORATING JACQUARD CARDS FOR EMBROIDERING MACHINES
Filed April 19, 1927　　　8 Sheets-Sheet 1

Fig. 1.

K. G. Scheibel
INVENTOR

By: Marks & Clerk
Attys.

May 1, 1928.  
K. G. SCHEIBEL  
1,667,742  
MACHINE FOR PERFORATING JACQUARD CARDS FOR EMBROIDERING MACHINES  
Filed April 19, 1927     8 Sheets-Sheet 2

Fig.2.

K. G. Scheibel  
INVENTOR

By: Marks & Clerk  
Attys.

May 1, 1928.  1,667,742
K. G. SCHEIBEL
MACHINE FOR PERFORATING JACQUARD CARDS FOR EMBROIDERING MACHINES
Filed April 19, 1927   8 Sheets-Sheet 3

K. G. Scheibel
INVENTOR
By Marks & Clark
Attys

May 1, 1928.  1,667,742

K. G. SCHEIBEL

MACHINE FOR PERFORATING JACQUARD CARDS FOR EMBROIDERING MACHINES

Filed April 19, 1927   8 Sheets-Sheet 4

K. G. Scheibel
INVENTOR

By Marks & Clerk
ATTYS.

May 1, 1928.  1,667,742
K. G. SCHEIBEL
MACHINE FOR PERFORATING JACQUARD CARDS FOR EMBROIDERING MACHINES
Filed April 19, 1927  8 Sheets-Sheet 5

K. G. Scheibel
INVENTOR

By: Marks & Clark
Attys

May 1, 1928.  1,667,742
K. G. SCHEIBEL
MACHINE FOR PERFORATING JACQUARD CARDS FOR EMBROIDERING MACHINES
Filed April 19, 1927   8 Sheets-Sheet 7

K. G. Scheibel
INVENTOR

By: Marks & Clark
ATTYS.

Patented May 1, 1928.

1,667,742

UNITED STATES PATENT OFFICE.

KURT GUSTAV SCHEIBEL, OF DRESDEN, GERMANY.

MACHINE FOR PERFORATING JACQUARD CARDS FOR EMBROIDERING MACHINES.

Application filed April 19, 1927, Serial No. 185,057, and in Germany February 19, 1926.

Machines for perforating the jacquard cards for embroidering machines are known, in which the vertical and horizontal displacements of the index pin with respect to the pattern board are transmitted to two separate drums which act as abutments for the groups of perforating punches when the paper band is being perforated and which are provided with suitable raised and depressed parts. In such machines it has already been proposed to cause the means for setting the index pin to act on the drums through a coupling which was released after the perforations have been made, so as to enable the drums to return into their initial position. With such an arrangement the forward feed of the carrier for the perforating punches with respect to the drums has been effected by means of a mechanically driven shaft, which carrier also supports the paper band, and both the forward feed of the paper band and the reverse rotation of the drums has been effected from the driving shaft.

The present invention relates to a machine of this kind and consists in certain improvements of the same. In the improved machine the drums are composed of separate discs, on the peripheries of which are recesses and which are mounted on a shaft extending through them so as to rotate freely thereon and are each connected to a system of levers capable of returning the drums into the zero position, a pin coupling being provided on the shaft for each drum so as to be rotatable and longitudinally slidable, which coupling may be connected to the drum or to the frame, the drum mechanism being mounted in the middle of the pattern board and each coupling being rotated by a shaft lying parallel to the drum shaft and capable of being adjusted by hand, which is also operatively connected to the means for setting the index pin, such that after the index pin has been set by the driving shaft of the mechanism the coupling members are displaced with respect to the frame and the index pin thereby locked, while the drums are released to be acted on by the system of levers which enables them to be returned.

Within the compass of this new constructional form of the machine special constructional forms are provided for the various mechanisms, which are described in detail below. Among other advantages the new constructional form of the machine has that of exceedingly small dimensions.

The new machine is illustrated in the accompanying drawings, in which.

Figure 16:
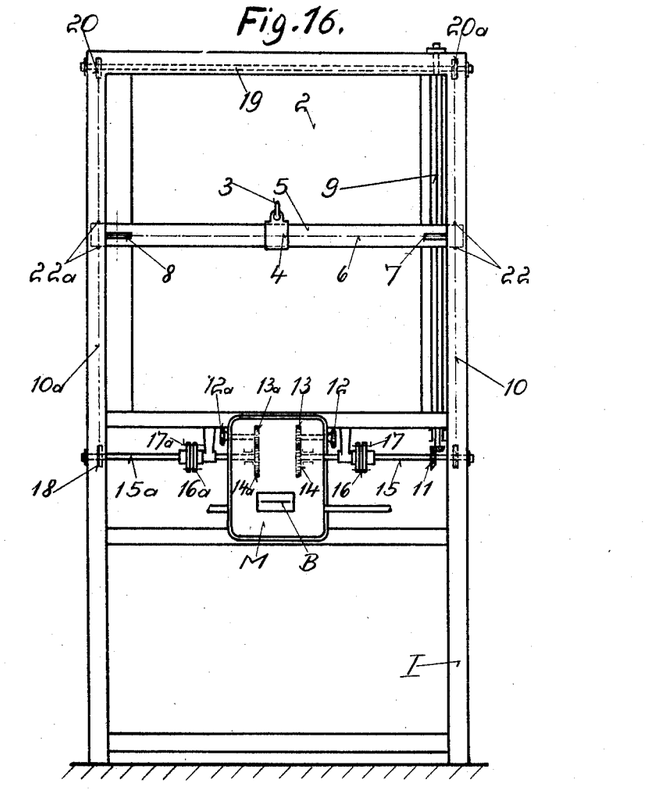
Fig. 16 is a front elevation of the entire arrangement of the perforating machine on the pattern board.
Figure 17:
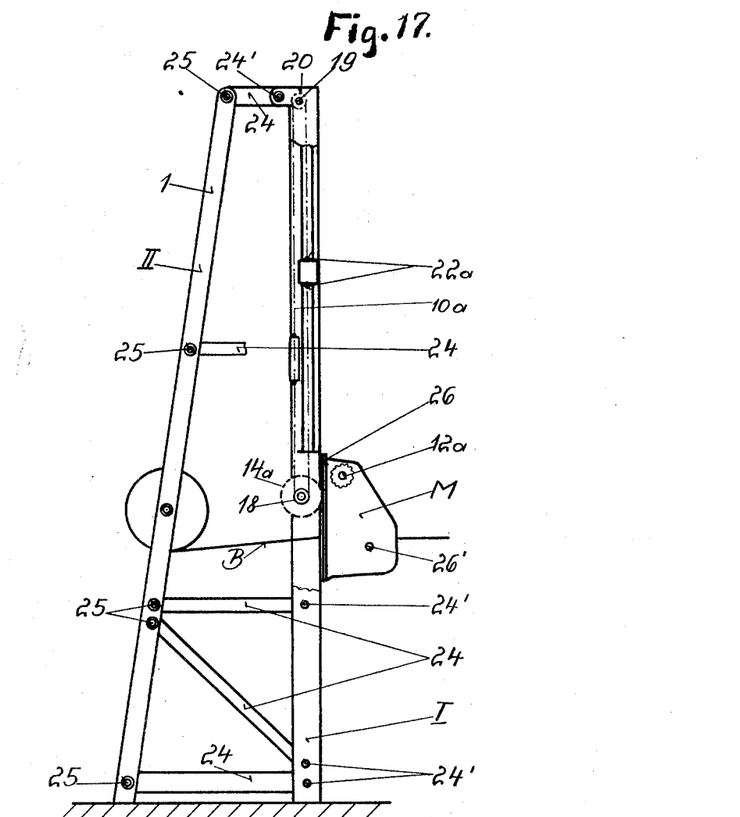
Fig. 17 is a side view of the same.
Figure 18:
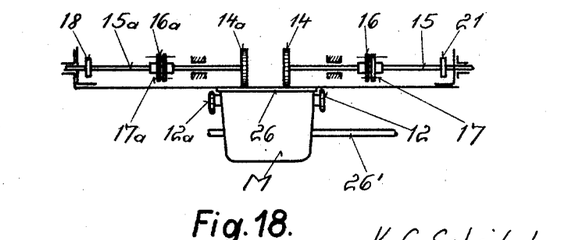
Fig. 18 is a view from above of the perforating machine with the shafts which are in operative connection with the adjusting means for the index pin.
Figure 19:
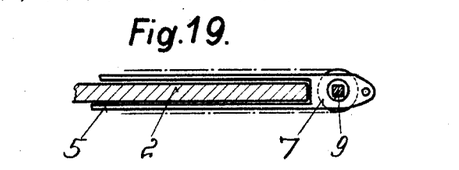
Fig. 19 is a detail.

As regards Figs. 16 to 18 which show the whole arrangement the following is to be said, In the frame 1 the pattern board 2 is fixed, on which the enlarged pattern is stretched. The index pin 3 which coacts with the pattern is mounted on a sliding member 4 which is capable of sliding on the horizontal rail 5. The sliding motion is imparted to it by an endless rope (chain, belt or the like) 6 which is guided over the pulleys 7 and 8. The pulley 8 is mounted so as to rotate freely on its shaft, while the pulley 7 is fixed on a square part of the shaft 9, so that it cannot turn thereon, as shown in Fig. 19. For the rest the pulleys 7 and 8 are journalled in the guide rail 5. The guide rail 5 is fixed at either end to an endless band (chain or the like) 10 and 10$^a$.

The stretches of these endless bands run vertically.

The upright shaft 9 is rotated by a pair of bevel wheels 11, one bevel wheel being mounted on the lower end of the shaft 9 and the other bevel wheel on a shaft capable of being turned by hand by means of the member 12. The member 12 is mounted on the end of a shaft projecting out of the casing of the perforating machine M, a spur wheel 13 being on the other end. This spur wheel meshes with a spur wheel 14 on the shaft 15, on which is mounted one of the bevel wheels 11. The shaft 15 is parallel to the pattern board and is journalled on the frame 1. This shaft is divided and bears the two coupling members 16 which are connected together by pins 17 (or pawls). From the hand-operated member 12 the index pin 3 is adjusted with respect to the horizontal component.

At the other side of the perforating machine M is a second hand-operated member 12$^a$, with which a spur wheel 14$^a$ can be acted on through a spur wheel 13$^a$. The spur wheel 14$^a$ is mounted on the horizontal shaft 15$^a$ which is coaxial with the shaft 15 already referred to. The shaft 15$^a$ is also journalled on the frame 1; it is also made in two parts and carries the coupling members 16$^a$ which are capable of being connected together by pins 17$^a$ (or pawls). On the shaft 15$^a$ is fixed the pulley 18, over which the vertically running endless band 10$^a$ is guided, which also runs over a pulley 20 fixed on a horizontal shaft journalled in the top of the frame. The shaft 15$^a$ thus drives the shaft 19, on the other end of which shaft is a pulley 20$^a$, over which the vertically running endless band 10 is guided. This band is guided at the bottom over a pulley 21 which is mounted so as to rotate freely on the shaft 15. As the bands 10 and 10$^a$ are fixed at 22 and 22$^a$ to the guide bar 5, the said bar, in a slot in which, as shown in Fig. 19, the pattern board 2 is guided, is raised and lowered by the turning of the shaft 15$^a$, whereby the index pin is adjusted as regards the vertical component.

The frame 1 consists of two rigid frames, a front frame I and a rear frame II, which are connected together by transverse struts 24. These struts 24 are pivotally attached at 24' to the front frame I and are pivotally and releasably attached by screws at 25, to the rear frame II, so that, after releasing the screws the two parts of the frame and the transverse struts 24 can be laid flat against one another.

Figure 14:
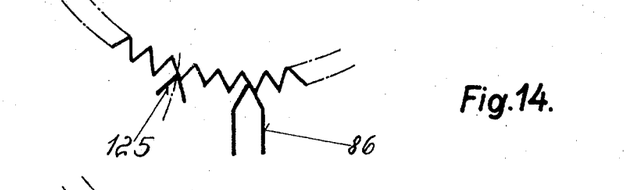
Figure 20:
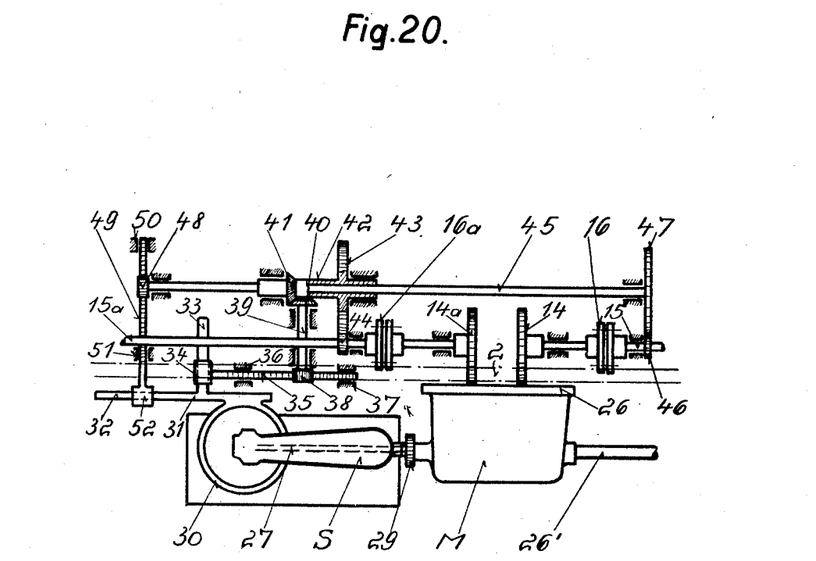
Fig. 20 shows the perforating machine combined with the controlling embroidering machine and the driving means for the same, seen from above.

The spur wheels 14 and 14$^a$ which are mounted opposite one another on the shafts 15 and 15$^a$, as is shown in Figs. 14, 18 and 20, engage through the rear wall 26 of the casing of the perforating machine M into the said perforating machine, meshing directly with spur wheels on the shafts of the drums, the shafts of the drums not being shown. The paper band B which is to be perforated is passed through the perforating machine in a direction perpendicular to the surface of the pattern board.

The index pin is adjusted by the hand operated members 12 and 12$^a$, which at the same time set the drums, the arrangement being such that the person operating the machine can accurately follow the position of the index pin. After the couplings 16, 16$^a$ have been disengaged, the index pin may however be adjusted by hand (for the purpose of returning the index to the initial position or the like), without the driving mechanism of the perforating machine being acted on so as to alter the setting of the drums. The perforating machine is driven in a known manner from the shaft 26' which is parallel to the pattern board, so as to bring about at each revolution of the shaft, which commences after the drums have been set, the perforation of the cards, after which the drums turn back automatically into the initial position, during which backward rotation the drums are automatically disengaged from the spur wheels 14 and 14$^a$. In any case the person operating the machine can at any time check the perforating of the paper band B from where he stands.

Figure 21:
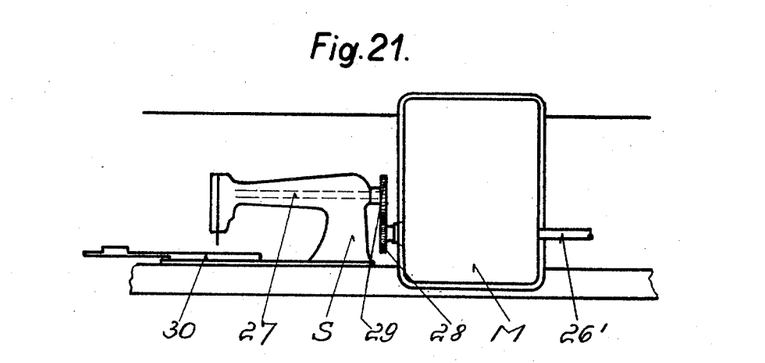
Fig. 21 is a front elevation of the same.

The relative arrangement of perforating machine and pattern board enables a checking embroidery machine S to be connected directly to the perforating machine M, as is shown in Figs. 20 and 21, the arrangement being such that the main shaft 27 is parallel to and immediately in front of the pattern board and is driven by spur gearing 28, 29 from the shaft 26' of the driving machine.

The embroidering frame 30 lies in a horizontal plane (being therefore at right angles to the surface of the pattern board 2) and is always visible to the person operating the machine from where he stands. This embroidering frame is provided with a guide bar 31 having arms 32 and 33 at right angles to one another, of which the arm 32 is parallel to the pattern board and the arm 33 perpendicular to the surface of the pattern board. The arm 33 is embraced by a sliding collar 34 fixed on the end of a rack 35 which rack is parallel to the pattern board and is capable of being slid longitudinally in the bearings 36 and 37. In engagement with this rack is a pinion 38 mounted on the end of a horizontal shaft 39. The shaft 39 is driven by a pair of bevel wheels 40, 41. The bevel wheel 41 is mounted on a hollow shaft 42 which is driven by the spur wheels 43, 44, from the shaft 15$^a$ which is parallel to the pattern board. Thus, from the hand operated member 12$^a$ not only the index pin 3 and the corresponding drum of the perforating machine are set, but the embroidering frame 30 as well, as regards one component of the stitch adjustment.

Through the hollow shaft 42 there extends a shaft 45 parallel to the pattern board, which shaft 45 is driven through spur wheel gearing 46, 47 from the shaft 45 (see Fig. 20) the spur wheel 48 is mounted, which meshes with a rack 49. The rack 49 is capable of sliding in bearings 50 and 51 at right angles to the pattern board 2. It has fixed to it a collar 52 which slides on the arm 32 of the bar 31 of the embroidering frame 30. Thus, by means of the hand operated member 12 not only the index pin and the corresponding drum of the perforating machine, but also the embroidering frame 30 is acted on as regards the other component of the stitch adjustment. It should be noted that the driving wheels 46 and 44 on the shafts 15 and 15ª are behind the couplings 16 and 16ª, such that a displacement of the embroidering frame 30 always takes place with the displacement of the index pin, irrespective of whether the means for setting the index pin are connected to the perforating machine or not.

The vertical and horizontal displacements of the index pin with respect to the pattern board are effected in the manner described by means of the hand wheels 12 and 12ª, through the intermediate wheels 13 and 14 or 13ª and 14ª driving the shafts 15 or 15ª respectively, by which shafts the index pin is controlled.

Figure 1:
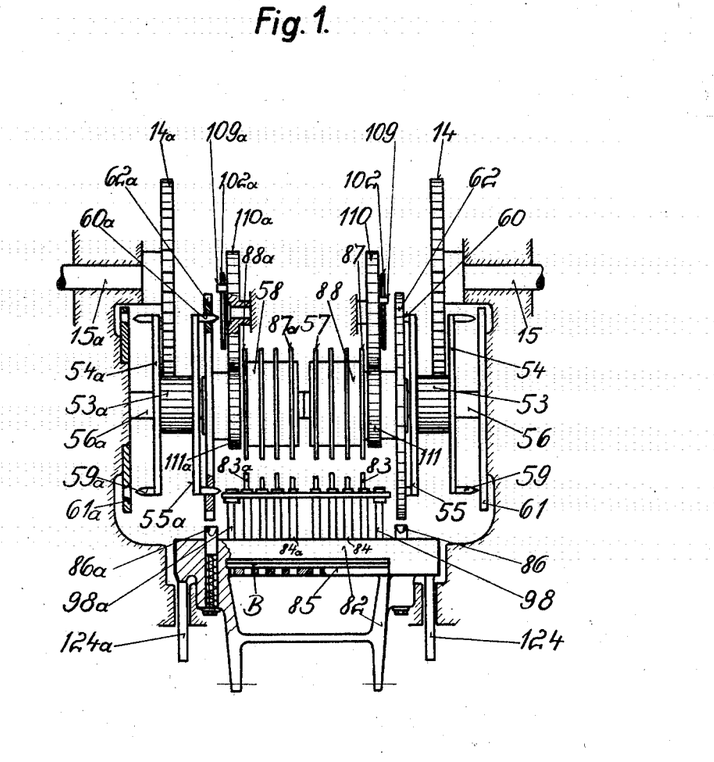
Fig. 1 shows the drum and the means for driving the same in front elevation.
Figure 2:
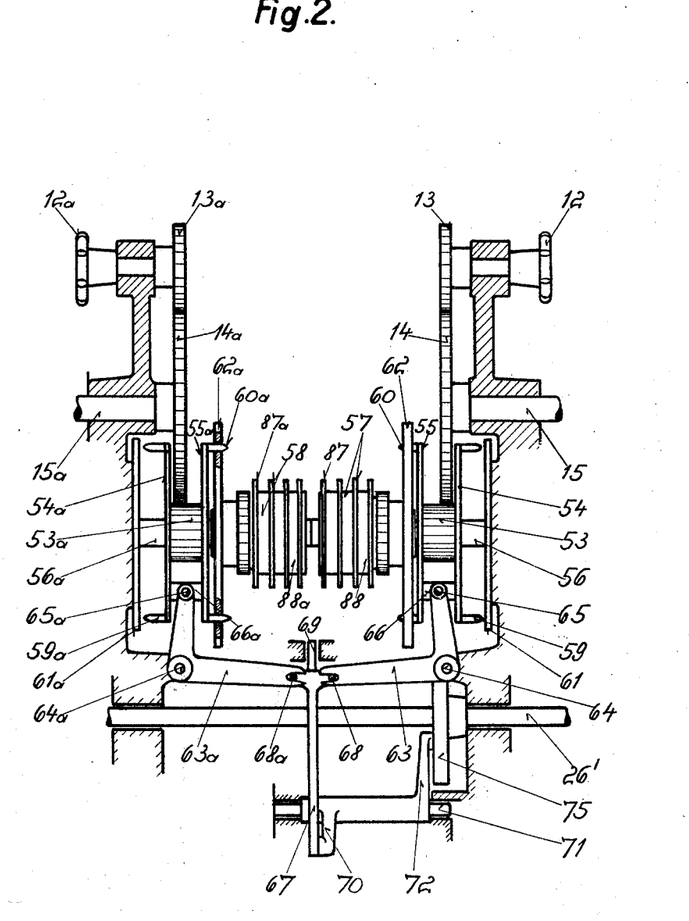
Fig. 2 is a view of the same from above.
Figure 3:
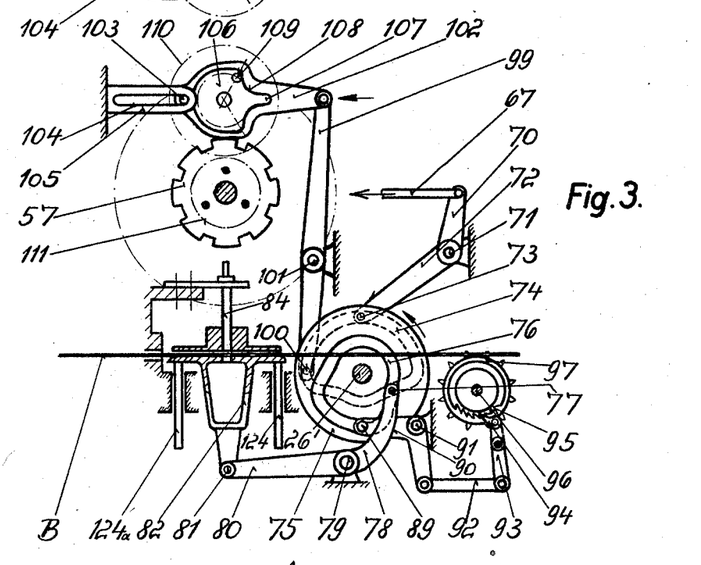
Fig. 3 is a side elevation partly in vertical section looking in the direction of the arrow shown in Fig. 1, some parts being omitted.

It will be seen from Figs. 1 to 3 that the spur wheels 14 and 14ª mesh with the spur wheels 53 and 53ª which latter spur wheels are mounted between the pin discs 54 and 55 or 54ª and 55ª respectively connected to them on the shafts 56 and 56ª of the drums 57 and 58, so as to be capable of rotating freely and sliding thereon. The spur wheels 53 and 53ª are of sufficient width to allow of this sliding motion, so that the spur wheels 14 and 14ª always remain in engagement with the spur wheels 53 and 53ª. The discs 54 and 55 and the discs 54ª and 55ª are provided on their sides facing away from one another with concentric rings of pins 59 and 59ª and 60 and 60ª respectively. The pins 59 and 59ª are intended to engage in the rings of holes in discs 61 and 61ª, which discs are fixed to the frame, while the pins 60 and 60ª are intended for coacting with rings of holes in the discs 62 and 62ª, which discs are fixed to the drums 57 and 58. Thus, when the pins 60 and 60ª engage in the holes in the discs 62 and 62ª, the index pin is coupled to the drums 57 and 58, so that the rotation of the hand wheels 12 and 12ª which cause the displacement of the index pin is transmitted to the drums 57 and 58. When, however, the pins 59 and 59ª are caused to engage with the fixed discs 61 and 61ª, the drums 57 and 58 are uncoupled, but the intermediate gears 13 and 14, 13ª and 14ª respectively are fixed, so that no displacement of the index pin can take place. The pins 59 and 60 and the pins 59ª and 60ª are pointed, so that they will readily slip into the corresponding holes, even when the drums 57 and 58 are not exactly in the correct position. The pins 59 and 60 and the pins 59ª and 60ª are made so long that the coupling members (consisting of the spur wheels 53 and 53ª with the discs 54 and 55 or 54ª and 55ª) are never entirely disengaged, but that the pins remain in engagement with the corresponding perforated disc until the other pins have entered the other perforated disc. Thus, no rotation of the coupling members can take place.

The longitudinal displacement of the coupling members is effected by means of bell cranks 63 and 63ª, which are pivoted on pins 64 and 64ª fixed in the frame. At 65 and 65ª the bell cranks are pivoted to slide blocks 66 and 66ª which are capable of sliding freely between the pin discs 54 and 55 and 54ª and 55ª respectively. The other ends of the bell cranks are each connected by a universal joint to a bar 67, pins 68 and 68ª on laterally extending arms of the said bar engaging in longitudinal slots at the ends of the arms of the bell cranks 63 and 63ª. The end 69 of the bar 67 is longitudinally slidable in a movable bearing, while the other end of the bar is pivotally connected to the arm 70 of a bell crank which rocks on the fixed shaft 71, the other arm 72 being provided with a roller 73 which engages in the cam slot 74 on one side of a cam disc 75 mounted on the driving shaft 26′. Thus, the cam slot 74 imparts a reciprocating or swinging motion to the bar 67, which motion rocks the bell cranks 63 and 63ª, whereby the setting of the coupling members carrying the driving wheels 53 and 53ª is effected.

On the other side of the cam disc 75 is a cam groove 76 in which a roller 77 on the end of a lever 78 engages, which lever is fixed on the shaft 79. On this shaft is also mounted the lever 80 which is pivoted at 81 to the punch carrier 82.

The punch carrier 82 is thus raised and lowered by the rocking motion of the levers 78 and 80, i. e. is moved with respect to the drums 57 and 58, so that the relatively stepped and staggered ends 83 and 83ª of the punches 84 and 84ª which are mounted in the carrier 82 so as to be longitudinally displaceable in a known manner are moved towards the drums, where they either engage with the ridges or depressions on the periphery of the drums. The carrier 82 is provided in a known manner with a slot 85 for the passage of the paper band B to be perforated. On the carrier 82 are also provided the pins 86 and 86ª which coact with teeth fixed on the drums 57 and 58. These teeth are provided on the edge of the perforated discs 62 and 62$^a$. The pins 86 and 86$^a$ which are capable of sliding in the punch carrier 82 and are spring loaded are so arranged with respect to the punches 83 and 83$^a$ that the pins 86 and 86$^a$ engage in the ring of teeth on the discs 62 and 62$^a$ before the punch ends engage with the depressions in the periphery of the drums 57 and 58. For the better understanding of the drawing it may be mentioned that the said ridges and depressions are provided on the discs 87 and 87$^a$ in the manner to be described below. The drums 57 and 58 are built up from the discs 87 and 87$^a$ with interposed distance rings 88 and 88$^a$. The object of the pins 86 and 86$^a$ which engage in the rings of teeth on the discs 62 and 62$^a$ is to effect the fine adjustment of the drums 57 and 58, after they have been coarsely adjusted by the hand wheels 12 and 12$^a$. Obviously it is of importance that the drums should be accurately adjusted to the size of stitch, so that the point of the index pin shall point exactly to the particular point of the pattern and that the punches shall punch the paper band exactly at the required point.

In the cam groove 76 there also engages a roller 89 mounted on the end of one arm of a bell crank 90 pivoted on a pin 91 fixed to the frame. The end of the other arm of the bell crank 90 is attached to a push bar 92, the other end of which bar is attached to one arm of a two-armed lever 93, the end of the other arm of which is a pawl 94 of a pawl and ratchet mechanism, the ratchet wheel 95 for which is fixed on the shaft 96. On the shaft 96 are also mounted the pin drums 97, the pins of which engage in the marginal perforations of the paper band, which marginal perforations are continuously produced by punches 98 and 98$^a$ which are fixed and therefore are always in the operative position. Thus, the cam groove 76 produces the intermittent forward feed of the paper band B.

A roller 100 at the end of a rocking lever 99 also engages in the cam groove 76 of the cam disc 75, the rocking lever being pivoted on a pin 101 fixed to the frame. The other end of the lever is pivoted to a sliding member 102. This sliding member has at its other end a pin 103, by which it is guided in a slot 104 of a slotted guide 105 fixed to the frame. The sliding member 102 is also provided with a slot 106 having a profile which lies symmetrically on either side of the longitudinal centre line of the sliding member and terminating in a recess 107 to which guiding surfaces 108 lead. There are two such sliding members 102 and 102$^a$, one for each drum.

Figure 4:
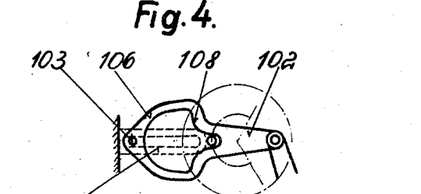
Fig. 4 shows the cutting slide alone in a different position to that shown in Fig. 1.

In the profiled slot of each slide 102 and 102$^a$ a pin 109 or 109$^a$ engages, which is mounted on one side of a toothed wheel 110 and 110$^a$. These toothed wheels mesh with spur wheels 111 and 111$^a$ respectively, which are mounted on the drums 57 and 58. Thus, the rotations of the drums are transmitted to the toothed wheels 110, 110$^a$, whereby the pins 109 and 109$^a$ are adjusted. According to whether the drums turn forward or backward (plus or minus) the pins 109, 109$^a$ move in the slots 106, the slots in the slotted guides being so formed that, when the drums perform their maximum rotation, the pins 109, 109$^a$ will rest against the guiding surfaces 108 of the slots. For smaller rotations of the drums the pins 109, 109$^a$ remain within the range of action of the slots 105 at any point corresponding to the rotation of the drum. On the lever 99 subsequently rocking over, the sliding members 102 are pushed until they reach the position shown in Fig. 4. During this motion the guiding surfaces 108 will sooner or later come in contact with the pin 109 or 109$^a$ in the symmetrical slot 106 and will force the pin to enter the recess, a corresponding rotary motion of the wheels 110, 110$^a$ carrying the pins taking place, which rotary motion is transmitted to the drums. This rotary motion must in all cases be such that, when the pins rest in the recesses 107, the initial position of the drums is restored.

Figure 5:
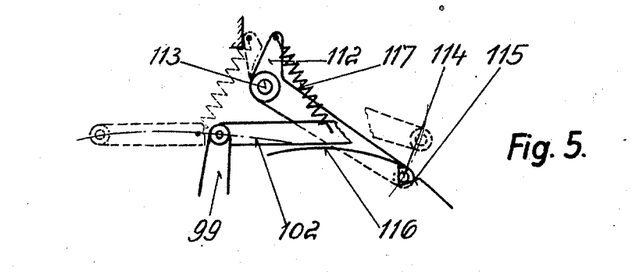
Fig. 5 shows a detail.
Figures 6, 7:
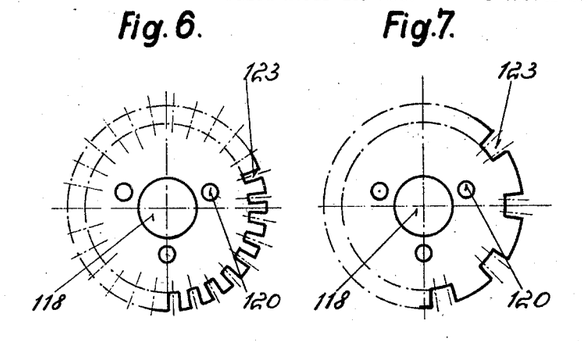
Figs. 6 to 10 show different stamped out discs, such as are used for building up the drums.
Figure 8:
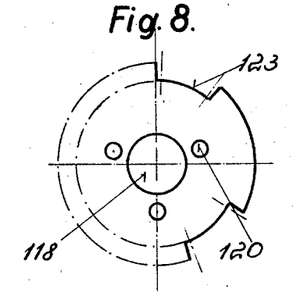
Figure 9:
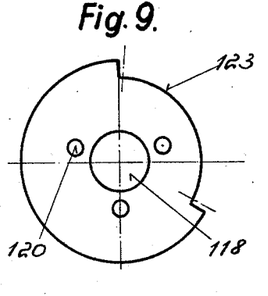

Since, during the movement of the sliding members, which is very rapid, there is a considerable acceleration of the masses and the drum may be easily turned too far, so that the pin 109, 109$^a$ will at first oscillate between the two guiding surfaces 108, safety means are provided such as shown in Fig. 5. These means consist of a bell crank 112 pivoted so as to rock about the pin 113 fixed to the frame and having at the end of one of its arms a pin 114 which is capable of engaging in a notch 115 on the periphery of a disc 116. The disc 116 is connected to the toothed wheel 110. To the end of the other arm of the bell crank 112 a tension spring 117 is atached, the other end of which is fixed to the sliding member 102. When the sliding member is in the position indicated by broken lines in Fig. 5, (which corresponds to that shown in Fig. 3) the spring 117 will pull the bell crank 112 into the position indicated by broken lines, in which the pin 114 is out of engagement with the notch 115. On the sliding member moving into the position shown by full lines in Fig. 5 (which position corresponds to that shown in Fig. 4) the point of attachment of the spring on the sliding member 102 passes the pivotal point 113 of the bell crank 112, so that the tension of the spring 117 tends to cause the pin 114 to engage in the notch 115 of the disc 116, thus locking the parts, so that shortly prior to the pin 109 entering the recess 107 the drums will have been secured against turning too far.

The device operates in the following manner:

When the coupling members 53 and 53ª are in the position shown in Figs. 1 and 2, the drums 57 and 58 are set by the hand wheels 12 and 12ª in accordance with the position of the index pin. When this has been done, the driving shaft 26' will commence to rotate. This rotary motion in the first place causes the punch carrier 82 to be raised, the adjusting teeth 86 and 86ª coming in contact with the teeth on the discs 62 and 62ª, thus effecting the fine adjustment of the drums 57 and 58. Thereupon the ends 83 and 83ª of the punches engage with the drum discs 87, 87ª, so that the paper band B which has also been raised is perforated. Thereupon the controlling lever of the punch carrier rocks back, while the controlling levers of the couplings are put in motion by the cam disc, so that the coupling members carrying the spur wheels 53 and 53ª are pushed aside until the pins 59 and 59ª enter into engagement with the perforations in the discs 61 and 61ª on the frame of the machine. The drums 57 and 58 are thus uncoupled from the index pin of the pattern board and can be returned into their initial position, which is effected by the gear for operating the sliding member 102 being put in motion by the cam disc 75. During this period no movement of the index pin can take place, as it is absolutely locked by the engagement of the pins 59 and 59ª in the stationary discs 61 and 61ª. The sliding member 102 together with the pins 109 and 109ª returns the drums 57 and 58 into their initial position. As soon as this has taken place, the sliding member itself returns into its initial position and the coupling parts, which are the spur wheels 53 and 53ª, are brought back into the position shown in Figs. 1 and 2, the pins 60 and 60ª by engaging in the holes in the drum discs 62 and 62ª effecting the fine adjustment of the drums 57 and 58. While these operations are taking place, the operating gear 90 to 93 for the feed mechanism for the paper band is also put in motion by the cam disc 75 so that the paper band is fed forward.

After one revolution of the driving shaft 26' all these operations are completed, so that the cycle of operations can recommence.

Each component of the motion of the index pin 3 is transmitted by suitable means to the drums 57 and 58. The drum 57 is provided for the horizontal and the drum 58 for the vertical component. The drums are mounted so as to rotate freely on the shaft 56 and are rigidly connected to the spur wheels 53 and 53ª respectively. The rotary motion is imparted to the drums from the shafts 15 and 15ª through spur wheels 14, 14ª on the said shafts, which mesh with the spur wheels 53, 53ª on the drums.

Figure 11:
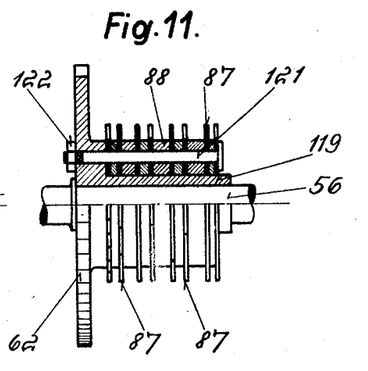
Fig. 11 shows a drum partly in vertical longitudinal section and partly in elevation.

As shown in Figure 11, the drums themselves are built up out of separate steel discs. These discs have a central hole 118 with which they can be slid on to the core 119 of the drum. The discs also have three holes 120 equidistant from the centre, through which the clamping bolts 121 are passed. Distance rings 88 made of a light metal are inserted between the separate discs and the whole is drawn together by the nuts 122 on the bolts 121, so that a rigid unit is formed.

The discs are provided with recesses 123 stamped out of their periphery, the distance rings 88 being so dimensioned that the stamped out portion of the discs projects beyond the distance rings. Each two adjacent discs represent the plus and minus values. The discs themselves as regards their stamped out recesses correspond to the terms of a progression and have a plus and minus side. In the example shown in the drawing the arrangement is based on the geometrical progression having the terms 1, 3, 9, 27.

The discs allow of the material between the separate connected stitch values being entirely removed, i. e. of the formation of a common perforation, by which means the pitch from stitch value to stitch value may be kept very small.

Figure 10:
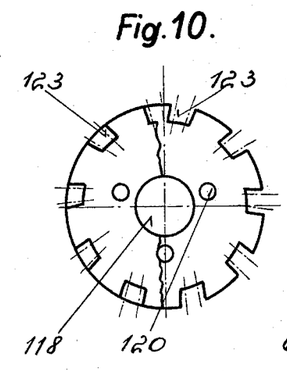

The discs which belong together for the plus and minus values have similar recesses, but these recesses must be offset with respect to one another in the drum. Thus, these discs may be stamped out together. Two such discs are superposed one on the other in Fig. 10, one being partially broken away. In order that, when the discs are mounted on the drum, the two discs may be readily put together correctly, the holes 120 for the bolts 121 are so arranged, that they form the points of an isosceles triangle, this triangle being so placed on the disc that it is only necessary to turn the disc through 120° for bringing the stamped out recesses into the correct relative position, when the bolt holes 120 are brought into register. The punches 84 coact with the recesses and teeth on the discs. Two groups of punches, one for each drum are arranged in a known manner on a carrier 82 common to the two groups, which carrier is supported by the guide bars 124, 124ª and is capable of being moved with respect to the drums. The carrier is also provided in a known manner with a slot for the passage of the intermittently forwardly fed paper band B. The upper ends 83, 83ª of the punches are reduced in diameter, in order that they can enter into the recesses in the disc, some of which are very small.

In the example shown the punches are of different length so that they come into operation successively. Instead of this the diameters of the perforating discs might differ one from the other.

Figure 12:
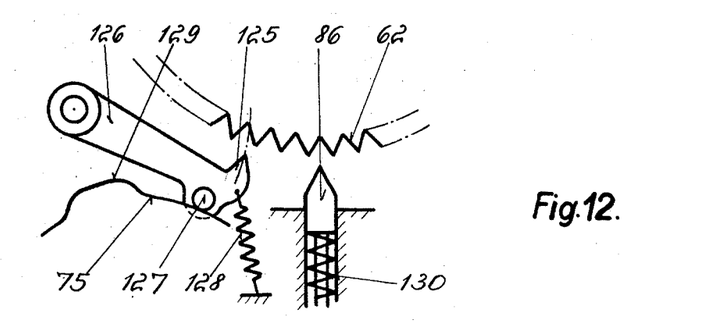
Figs. 12 to 15 are diagrammatic views showing how the drums are set by means of the adjusting tooth.

The drums 57 and 58 are rigidly fixed to toothed wheels 62 and 62$^a$ respectively and opposite the said toothed wheels on the carrier 82 are spring-loaded longitudinally slidable pins 86 and 86$^a$ respectively (cf. Fig. 12). These pins are so arranged that, on the carrier 82 being raised, they engage in the teeth of the wheels 62, 62$^a$ sooner than the ends 83 of the punches engage with the discs of the drums, the sharp ends of the pins 86 sliding into a gap between two teeth, thus accurately setting the drums.

Figure 13:
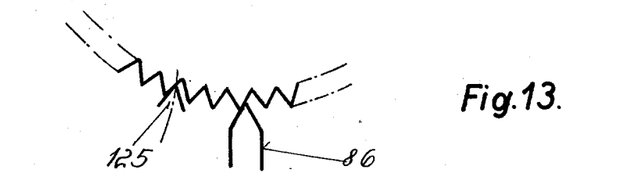
Figure 15:
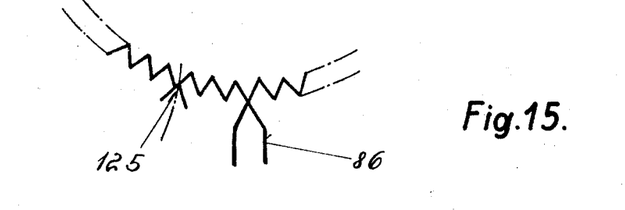

Should by chance one of the pointed ends of the pins 86 or 86$^a$ come against the point of a tooth on the corresponding toothed wheel 82 or 62$^a$, (as indicated in Figure 15) the fine adjustment would not be made. In order to prevent this happening, an auxiliary tooth 125 is provided on the end of a rocking lever 126 having a roller 127 resting on the cam 75 and kept in contact with the cam by a spring 128. The swell 129 on the cam 75 pushes the lever 176 towards the teeth on the disc 62, which causes a slight rotation of the drum, whereupon the lever 126 immediately rocks back into its normal position. This slight rotation of the drum suffices for allowing the pin 86 to slip into a gap between the teeth under the pressure of the spring 130 wound on the pin 86, the said spring having been compressed by the pin 86 coming against the point of a tooth on the toothed wheel 62. Thus, the action of the auxiliary tooth 125 is to ensure the toothed wheel 62 being brought into the positions shown in Figs. 13 and 14.

What I claim is:

1. A machine for perforating jacquard cards comprising a pattern board, an index pin adapted to be displaced vertically and horizontally of the pattern board, a plurality of groups of punches, abutments for each group, each abutment consisting of a rotatable drum composed of a plurality of disks, each disk being provided on its periphery with recesses, shafts on which the drum are rotatably mounted, means to rotate the drums in accordance with the movement of the index pin, means for locking the index pin in a desired position, means to move the punches towards the drums when the pin is locked and means to return the drums to a zero position.

2. A machine for perforating jacquard cards as claimed in claim 1 in which the disks forming the drums are formed of sheet material having the recessed edges stamped out therefrom.

3. A machine for perforating jacquard cards as claimed in claim 1, in which the drums are formed of the recessed disks and spacing distance pieces therebetween, all bolted together by axial bolts.

4. A machine for perforating jacquard cards as claimed in claim 1 and in combination therewith a carrier for the punches and means for moving said carrier towards and from said drums.

5. A machine for perforating jacquard cards as claimed in claim 1 and in combination therewith, a carrier on which the punches are mounted, means for moving said carrier towards and from said drums, spring pressed pins mounted on said carrier, and teeth formed on said drums, said spring pressed pins adapted to engage between said teeth to accurately adjust said drums by a rotation thereof before operation of the punches.

6. A machine for perforating jacquard cards comprising a frame, a pattern board, an index pin adapted to be displaced vertically and horizontally of the pattern board, a plurality of groups of punches, an abutment for each group of punches consisting of a rotatable drum having peripheral recesses formed therein, shafts on which said drums are rotatably mounted, hand operated means to move the index pin relative to the pattern board, and to rotate the drums, one drum in accordance with one of said component movements thereof and the other drum in accordance with the other of said component movements. each of said hand operated means comprising a gear wheel, means operated by the gear wheel to move the index pin, a second gear wheel engaging said first gear wheel slidably and rotatably mounted on the shaft on which the drum is mounted, clutch members on the sliding gear wheel and the drum whereby the drum may be driven when the second gear wheel is rotated by the first gear wheel. a fixed clutch member on said frame, a clutch member on the sliding gear wheel adapted to be engaged when the other clutch members are disengaged to lock the said second gear against rotation and thereby lock the index pin against movement, a punch carrier movable towards and away from said drums, means for so moving said punch carrier, and means operated by said last named means for shifting the sliding gear wheel into and out of its clutching positions.

7. In a device for punching jacquard cards as claimed in claim 6 and in combination therewith, means to return the drum to zero position after the operation of the punches.

In testimony whereof I have signed my name to this specification.

KURT GUSTAV SCHEIBEL.